(12) United States Patent
Fischer

(10) Patent No.: US 9,341,204 B2
(45) Date of Patent: May 17, 2016

(54) FASTENING CLIP FOR MOUNTING A COMPONENT

(75) Inventor: Anton Fischer, Schechingen-Leinweiler (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/114,771

(22) PCT Filed: Apr. 20, 2012

(86) PCT No.: PCT/EP2012/001710
§ 371 (c)(1),
(2), (4) Date: Jan. 8, 2014

(87) PCT Pub. No.: WO2012/150004
PCT Pub. Date: Nov. 8, 2012

(65) Prior Publication Data
US 2014/0109357 A1    Apr. 24, 2014

(30) Foreign Application Priority Data

May 2, 2011    (DE) .......................... 10 2011 100 235

(51) Int. Cl.
| F16B 2/22 | (2006.01) |
| F16B 2/24 | (2006.01) |
| F16B 5/06 | (2006.01) |
| F16B 21/08 | (2006.01) |

(52) U.S. Cl.
CPC . *F16B 2/22* (2013.01); *F16B 2/243* (2013.01); *F16B 5/0642* (2013.01); *F16B 21/086* (2013.01); *Y10T 24/307* (2015.01); *Y10T 24/44* (2015.01)

(58) Field of Classification Search
CPC .......... F16B 2/22; F16B 2/243; F16B 2/0642; F16C 21/086; Y10T 24/44

USPC .................. 24/289, 294, 295, 292, 293, 458, 24/581.11
See application file for complete search history.

(56) References Cited

U.S. PATENT DOCUMENTS

| 3,525,129 | A | 8/1970 | Holton |
| 5,722,124 | A * | 3/1998 | Wisniewski .................... 24/295 |
| 8,832,907 | B2 * | 9/2014 | De Jong et al. ................ 24/293 |
| 8,904,607 | B2 * | 12/2014 | Diez Herrera .................. 24/295 |
| 9,009,928 | B2 * | 4/2015 | Binkert .................... F16B 2/243 24/293 |
| 2002/0100146 | A1 * | 8/2002 | Ko ................................. 24/295 |
| 2008/0289155 | A1 * | 11/2008 | Kim et al. ...................... 24/295 |
| 2010/0303539 | A1 | 12/2010 | Aoki et al. |
| 2012/0301218 | A1 * | 11/2012 | De Jong ................. F16B 21/07 403/326 |

FOREIGN PATENT DOCUMENTS

| DE | 2 230 309 | 1/1974 |
| DE | 202006007873 | 8/2006 |

* cited by examiner

*Primary Examiner* — Robert J Sandy
*Assistant Examiner* — Michael Lee
(74) *Attorney, Agent, or Firm* — Tarolli, Sundheim, Covell & Tummino LLP

(57) ABSTRACT

A fastening clip (10) for mounting a component part (28), especially an airbag or an airbag module, on a support (30) includes a head portion (12), a clip body (14) and retaining elements (16) laterally projecting from the clip body (14) which are elastically deflectable. The clip body (14) defines an interior and includes windows (20) through which the retaining elements (16) protrude outwardly from the interior. An assembly having such fastening clip (10) furthermore includes a support (30) having a mounting aperture (34) matching with the dimensions of the clip body (14).

19 Claims, 2 Drawing Sheets

FASTENING CLIP FOR MOUNTING A COMPONENT

RELATED APPLICATIONS

This application corresponds to PCT/EP2012/001710, filed Apr. 20, 2012, which claims the benefit of German Application No. 10 2011 100 235.2, filed May 2, 2011, the subject matter, of which are incorporated herein by reference in their entirety.

BACKGROUND OF THE INVENTION

The invention relates to a fastening clip for mounting a component part, especially an airbag or an airbag module, on a support, comprising a head portion, a clip body and retaining elements laterally projecting from the clip body which are elastically deflectable. The invention further relates to an assembly comprising such fastening clip and a support.

From DE 20 2006 007 873 U1 a generic securing clip adapted for fastening an airbag to a car body component is known. The fastening clip has a base portion adapted to be inserted in an opening of the support and including plural bending portions. In such fastening clip it is provided that the bending portions are bent about plural respective bending axes when the fastening clip is inserted. Thus the deformation necessary for inserting the fastening clip is divided into several bending steps, thus reducing the effort (pressing force).

SUMMARY OF THE INVENTION

It is the object of the invention to allow a safety-relevant connection to a fastening clip having a simple structure which is adapted to be inserted in a mounting aperture with little effort and ensures high retaining forces.

This object is achieved by a fastening clip comprising the features of claim 1. Advantageous and expedient configurations of the fastening clip according to the invention are described in the subclaims.

The fastening clip according to the invention for mounting a component, especially an airbag or an airbag module, on a support comprises a head portion, a clip body and retaining elements laterally projecting from the clip body which are elastically deflectable. The clip body defines an interior and includes windows through which the retaining elements protrude outwardly from the interior.

This structure of the fastening clip permits keeping the pressing force determined by the elasticity of the retaining elements low during assembly, while the removal force required for removing the fastening clip is considerably higher. In the case of a removal force acting on the fastening clip each of the retaining elements gets jammed between a window edge of the clip body and the edge of the mounting aperture of the support in which the fastening clip is inserted. Therefore, removal of the fastening clip is only possible when the retaining elements are completely deformed.

The structure of the fastening clip according to the invention permits the clip body and the retaining elements, preferably also the head portion, to be formed in one piece. This entails advantages both during manufacture, because it is not necessary to assemble plural components, and in terms of logistics, because storage and transportation are facilitated.

The fastening clip according to the invention is preferably completely made of steel so as to meet the requirements to stability at the best.

According to a preferred embodiment of the invention, the clip body includes side walls in which the windows are formed and extensions connected to the side walls by which the retaining elements are formed. Such configuration of the fastening clip excels by a clear easily reproducible geometry and requires only few reforming steps during manufacture.

An optimum elastic deflecting behavior of the laterally projecting retaining elements is achieved by a configuration in which the extensions extend from the side of the side wall facing away from the head portion and are bent inwardly so far that a respective retaining portion of the extension projects outwardly through the window of the corresponding side wall.

In order to achieve the retaining portions to get jammed under load in double layers between the clip body and the edge of the mounting aperture, each of the extensions is preferably bent so that a free end portion of the extension is guided back into the interior. This results in definite increase in the removal force.

This type of jamming can be assisted by the free end portion of the extension extending farther in the direction of the head portion than the corresponding window.

According to a special aspect of the invention, the fastening clip comprises a blocking means preventing the retaining elements from deflecting toward the interior in a mounted state. The blocking means does not only act as a locking for the fastening clip but also ensures that the deformation of the retaining elements is possible only under the action of extremely high force.

Preferably the blocking means comprises first blocking elements at the clip body and second blocking elements at the retaining elements. The first and second blocking elements interact at least under the influence of a removal force acting on the fastening clip.

According to a preferred embodiment of the blocking means, the first blocking elements are projections formed at the windows and the second blocking elements are bulges or apertures formed at the corresponding extensions on the sides facing the projections. The projections at the windows of the side walls engage in the bulges or apertures of the extensions when being loaded so that the retaining portions cannot move inwardly.

For the best possible introduction of the removal force acting on the fastening clip into the blocking means and the best possible conversion of said force in the blocking means there is provided a design according to which each of the extensions projects from a rim of the window facing away from the head portion and is directly opposed to the respective bulge.

The invention also provides an assembly comprising a fastening clip according to the invention and a support including a mounting aperture matching with the dimensions of the clip body.

BRIEF DESCRIPTION OF THE DRAWINGS

Further features and advantages of the invention result from the following description and from the enclosed drawings which are referred to and in which.

DESCRIPTION OF EMBODIMENT

Figure 1:
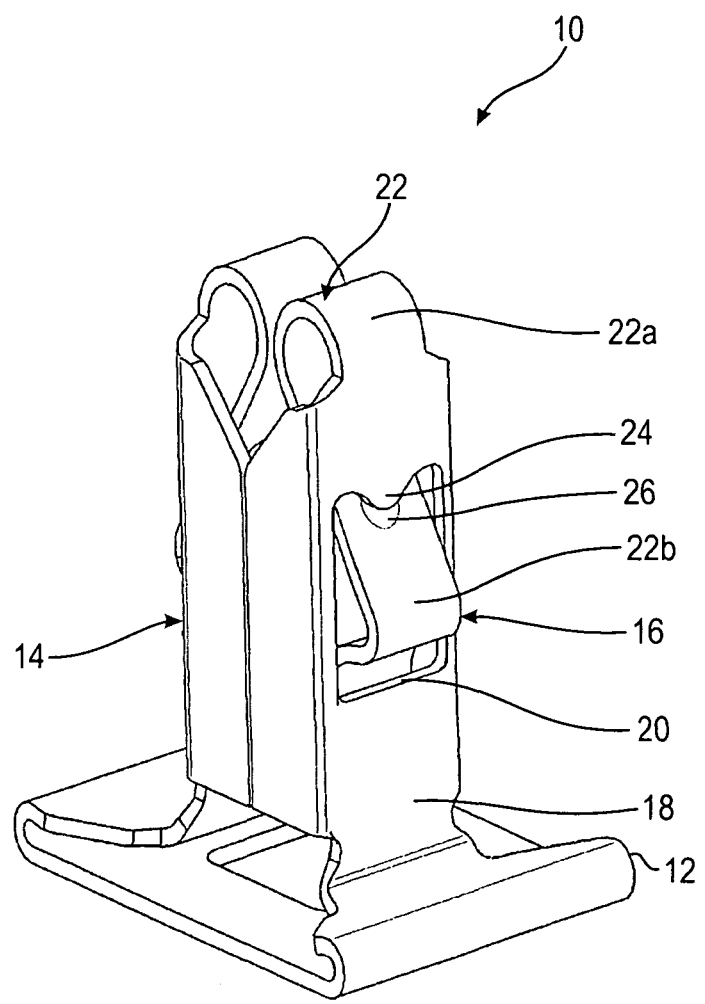
FIG. 1 shows a perspective view of a fastening clip according to the invention.

The fastening clip 10 which serves for producing a clip connection comprises a head portion 12, a clip body 14 and retaining elements 16. The fastening clip 10 is completely made of steel and is formed in one piece.

The clip body 14 which is composed of plural side walls 18 extends from the widened substantially flat head portion 12. The side walls 18 are substantially planar and all of them extend in the same longitudinal direction from the head portion 12. The clip body 14 with its side walls 18 defines an interior of the fastening clip 10. Each of two opposing side walls 18 has a substantially rectangular window 20 allowing for access to the interior of the fastening clip 10.

The two side walls 18 including the windows 20 also have oblong extensions 22 of which the elastically deflectable retaining elements 16 are formed. For this purpose, the extensions 22 extending from the respective side of the side wall facing away from the head portion 12 are bent in a particular manner. The extensions 22 can be subdivided into a transition portion 22a starting from the corresponding side wall 18, a retaining portion 22b and a free end portion 22c. The transition portion 22a is bent inwardly so far that the retaining portion 22b connected thereto extends outwardly from the interior of the fastening clip 10 through the window 20. The retaining portion 22b in turn is bent back so that the free end portion 22c connected to the latter is guided back into the interior of the fastening clip 10. In the interior the free end portion 22c of the extension 22 extends farther than the corresponding window 20 in the direction of the head portion 12.

The spaces of the two extensions 22 from each other, especially of the retaining portions 22b and of the free end portions 22c, are selected so that the retaining portions 22b protruding outwardly from the windows 20 can be inwardly deflected so far that they are no longer laterally projecting from the clip body 14 without the extensions 22 obstructing each other.

Each of the window frames has on the side facing away from the head portion 12 a projection 24 extending in the direction of the head portion 12 into the window 20. A bulge 26 matching with the projection 24 is formed at the corresponding extension 22. Instead of the bulge 26 also an aperture may be provided. The bulge 26 is provided on the side facing the projection 24 and directly faces the latter. The projections 24 and the bulges 26 together form a blocking means the mode of operation of which can be inferred from the following functional description of the fastening clip 10.

Figure 2:
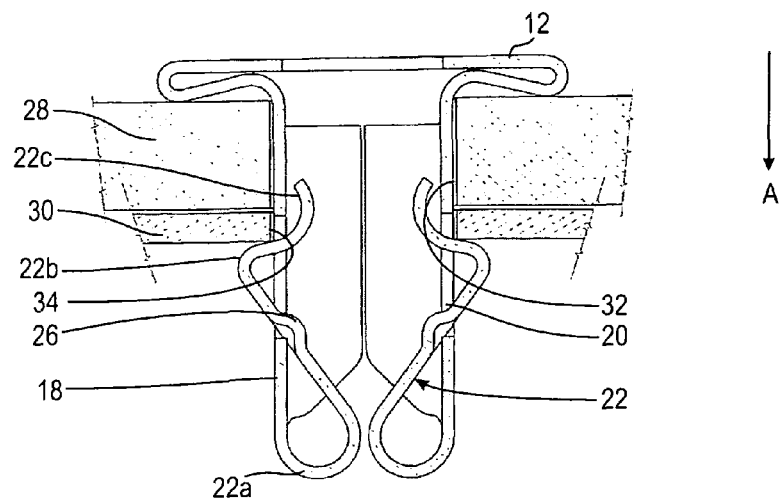
FIG. 2 shows a sectional view of the fastening clip of FIG. 1 in the assembled state.

FIG. 2 shows the fastening clip 10 in the mounted state in which the fastening clip 10 fastens a component part 28, in this case an airbag, to a support 30, in this case a car body component. For this purpose, the fastening clip 10 is pressed in a mounting direction A through an aperture 32 of the component part 28 and a corresponding mounting aperture 34 of the support 30. The mounting aperture 34 is dimensioned so that it is almost filled by the clip body 14. When inserting the fastening clip 10, the elastically deflectable extensions 22 are pressed inwardly by the rim of the mounting aperture 34 due to the ramp-like design of the laterally projecting retaining portions 22b. The extensions 22 are designed so that a pressing force in the mounting direction of not more than approx. 30 N is required for this purpose.

As soon as the retaining portions 22b have passed the mounting aperture 34, they are pressed outwardly through the windows 20 due to the elasticity of the extensions 22 and engage behind the rim of the mounting aperture 34, as is shown in FIG. 2. This state substantially corresponds to the unloaded state of the fastening clip 10, or the retaining portions 22b exert only small force on the rim of the mounting aperture 34. What is important is that in the mounted state the bulges 26 of the extensions 22 are located above the projections 24 of the windows 20.

When a removal force acting against the mounting direction A is exerted on the fastening clip 10, for example by the expanding airbag 28, the blocking means formed by the projections 24 and bulges 26 prevents the fastening clip 10 from being removed from the mounting aperture 34. As is evident from FIG. 2, under the influence of the removal force the side walls 18 would move opposite to the mounting direction A, while the extensions 22 which are supported by the retaining portions 22b on the rim of the mounting aperture 34 initially resist such movement. In this way the projections 24 are tightly pressed into the opposite bulges 26 so that the extensions 22, especially the retaining portions 22b, are prevented from moving inwardly. Hence the retaining portions 22b remain in their position and thus secure the fastening clip 10 in its mounted state.

Figure 3:
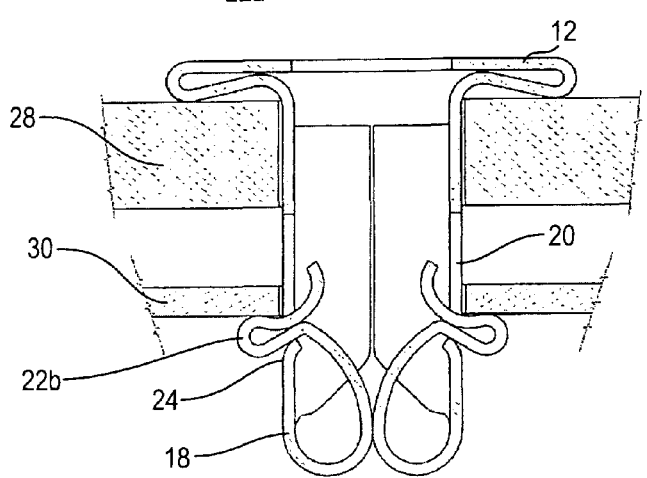
FIG. 3 shows the fastening clip of FIG. 2 under load in the direction of pull.

If the removal force exceeds a particular threshold value, the extensions 22 start deforming under the load as is illustrated in FIG. 3. The retaining portions 22b are clamped between the clip body 14, more exactly speaking the window edge including the projection 24, and the rim of the mounting aperture 34. Since the free end portions 22c of the extensions 22 are guided back into the interior of the fastening clip 10, the retaining portions 22b are jammed in two layers between the window edge and the rim of the mounting aperture 34. Thus also the deformation of the extensions 22 still strongly counteracts a removal of the fastening clip 10.

Figure 4:
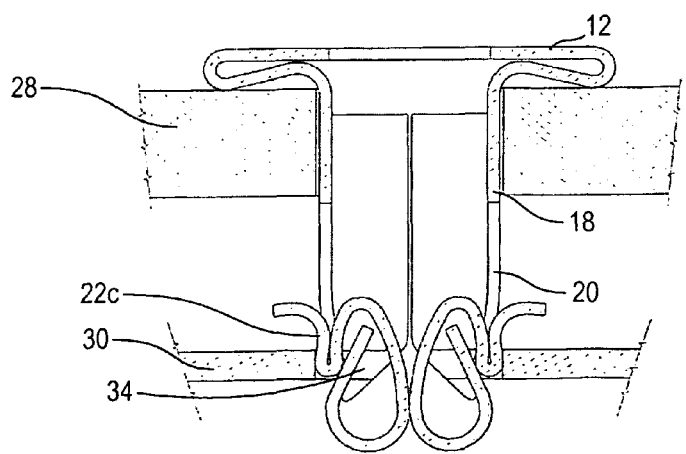
FIG. 4 shows the fastening clip of FIG. 2 in the deformed state.

Only when the removal force is so high that the extensions 22 can completely deform, the fastening clip 10 can be removed. This state is illustrated in FIG. 4. The fastening clip 10 including its extensions 22 is configured such that the removal force required for complete deformation is approximately 100 times higher than the pressing force necessary for assembly which, as a rule, is not reached when the component part 28 mounted with the fastening clip 10 is used as specified.

LIST OF REFERENCE NUMERALS

10 Fastening clip
12 head portion
14 clip body
16 retaining element
18 side wall
20 window
22 extension
22a transition portion
22b retaining portion
22c end portion
24 projection
26 bulge
28 component part
30 support
32 aperture of component part 28
34 mounting aperture

The invention claimed is:

1. A fastening clip (10) for mounting a component part (28), especially an airbag or an airbag module, on a support (30), comprising:
a head portion (12),
a clip body (14) extending from the head portion, and
retaining elements (16) laterally projecting from the clip body (14) which are elastically deflectable,
wherein the clip body (14) defines an interior and windows (20),
and wherein the clip body (14) includes side walls (18) in which the windows (20) are formed and extensions (22) connected to the side walls (18) of which the retaining elements (16) are formed, the retaining elements protruding through the windows outwardly from the interior to extend to the exterior of the clip body and engage the support when the fastening clip mounts the component part on the support.

2. The fastening clip (10) according to claim 1, wherein the clip body (14) and the retaining elements (16) are formed in one piece.

3. The fastening clip (10) according to claim 1, whereby it is completely made of steel.

4. The fastening clip (10) according to claim 1, wherein each of the extensions (22) extends from the side of the side wall (18) facing away from the head portion (12) and is bent inwardly so far that holding portions (22*b*) of the extension (22) protrudes outwardly through the window (20) of the corresponding side wall (18).

5. The fastening clip (10) according to claim 4, wherein the extensions (22) are bent such that a free end portion (22*c*) of the extension (22) is guided back into the interior.

6. The fastening clip (10) according to claim 5, wherein the free end portion (22*c*) of the extension (22) extends farther than the corresponding window (20) in the direction of the head portion (12).

7. The fastening clip (10) according to claim 1 having a blocking means which in a mounted state prevents the retaining elements (16) from deflecting in the direction of the interior.

8. The fastening clip (10) according to claim 7, wherein the blocking means includes first blocking elements at the clip body (14) and second blocking elements at the retaining elements (16) which interact at least under the influence of a removal force acting on the fastening clip (10).

9. The fastening clip (10) according to claim 8, wherein the first blocking elements are projections (24) formed at the windows (20) and the second blocking elements are bulges (26) or apertures formed at the corresponding extensions (22) on the sides facing the projections (24).

10. The fastening clip (10) according to claim 9, wherein the extensions (22) project from a respective rim of the window (20) facing away from the head portion (12) and are directly facing the bulges (26) or apertures, respectively.

11. An assembly comprising a fastening clip (10) according to claim 1 and a support (30) including a mounting aperture (34) matching with the dimensions of the clip body (14).

12. The fastening clip according to claim 1, wherein the clip body, the retaining elements, and the head portion are formed as one piece.

13. The fastening clip according to claim 1, wherein the head portion engages the component part when the fastening clip mounts the component part on the support.

14. The fastening clip according to claim 1, wherein relative movement between the component part and the support deforms the extensions.

15. A fastening clip for mounting a component part on a support, comprising:
   a head portion;
   a clip body extending from the head portion including side walls, the clip body defining an interior and having windows provided on the side walls;
   extensions extending from the side walls and defining elastically deflectable retaining elements that protrude through the windows outwardly from the interior to extend to the exterior of the clip body, the retaining elements engaging the support to secure the component part thereto when the clip body extends through an aperture of the component part and a corresponding aperture of the support.

16. The fastening clip according to claim 15, wherein each of the extensions extends from an end of the side wall spaced away from the head portion and is bent such that holding portions of the extensions protrude outwardly through the window of the corresponding side wall.

17. The fastening clip according to claim 15, wherein the extensions are bent such that the extensions extend from the exterior of the clip body and back into the interior to locate a free end portion of each of the extensions in the interior.

18. The fastening clip according to claim 15, wherein the head portion engages the component part when the fastening clip extends through the aperture of the component part and the corresponding aperture of the support.

19. The fastening clip according to claim 15 further comprising blocking means that prevent the retaining elements from deflecting in a direction toward the interior when the fastening clip is in a mounted state, the blocking means including projections extending into the windows and bulges or apertures on the corresponding extensions on a side facing the projections.

* * * * *